June 17, 1958    W. P. MANSFIELD ET AL    2,838,937
PRESSURE INDICATORS AND RECORDERS
Filed March 11, 1954    2 Sheets-Sheet 2

HT = 250 - 350 VOLTS
$R_2$ = 10,000 $\upsilon$
$R_3$ = 50,000 $\upsilon$
$R_4$ = 200,000 $\upsilon$
$R_5$ = Zero or a few ohms.
$C_2$ = .001 $\mu F$
V = EF 50

INVENTORS
WILFRED PERCIVAL MANSFIELD
and ALBERT HENRY CORNISH
BY
ATTORNEY

United States Patent Office 2,838,937
Patented June 17, 1958

2,838,937
PRESSURE INDICATORS AND RECORDERS

Wilfred Percival Mansfield and Albert Henry Cornish, Slough, England, assignors, by mesne assignments, to The British Internal Combustion Engine Research Association, Slough, England Application March 11, 1954, Serial No. 415,652

Claims priority, application Great Britain December 14, 1949

11 Claims. (Cl. 73—391)

This invention relates to pressure indicators and recorders and is a continuation-in-part of copending application Serial No. 200,292, filed December 11, 1950, now abandoned. More particularly this invention relates to pressure indicators and recorders of the kind having a pick-up with a disc or diaphragm which is moved against an applied fluid pressure by the pressure to be indicated so that movement of the disc or diaphragm occurs when the pressure being indicated substantially equals the applied pressure. In the operation of this particular pick-up device movements of said disc or diaphragm cause electrical changes in an associated circuit so that the time when pressure equalization occurs can be indicated and/or recorded. In this way, instantaneous pressures or a cycle of pressure changes in the apparatus to which the pick-up is attached may be indicated and/or recorded; in the latter case by varying the value of the applied pressure through the range to be indicated, a series of points throughout the cycle are obtained.

It is found that when it is required to record a curve representative of the pressure/time relationship, for example, of the gases in the cylinder of an internal combustion engine and the balancing pressure is progressively increased each cycle, the points marked upon a recorder indicating a rise of pressure and those indicating a fall of pressure approach one another as the peak of the curve is reached and consequently the interval of time between the movement of the disc or diaphragm in the two directions becomes less and less. Difficulty is therefore experienced in utilizing a gas filled discharge tube in the output of an electrical circuit between the pick-up and the indicator or recorder as the said interval of time becomes less than that required for the tube to recover the state in which it is ready to be discharged to record the second movement of the disc or diaphragm, although such a tube is particularly suitable for supplying the voltages required for recording.

Broadly speaking, the invention is distinguished from the prior art by making a recording cyclically over a period relatively long in which discrete voltage changes occur in the pick-up of opposite sign at relatively short periods of time. The period of one cycle is adequate for the recovery of one thyratron if only one voltage change should take place within each cycle, but as a pair or pairs of voltage changes take place within each cycle which are very closely spaced (when indicating a sharp peak in the pressure curve) when compared with the length of a cycle, one thyratron cannot recover quickly enough to be fired twice in that short interval. There are, therefore, provided, in accordance with the invention, two thyratrons which fire alternately, thus providing adequate time for each to recover before it is next required to fire.

The object of the present invention is to provide a pressure indicator and/or recorder making use of the desirable characteristics of a gas filled discharge tube to overcome the difficulties above referred to.

The invention consists in a pressure indicator or recorder of the kind having a pick-up provided with a disc or diaphragm one side of which is adapted to be placed in communication with the fluid the pressure variations of which are to be recorded, while the other side of the disc or diaphragm is in communication with a source of fluid the pressure of which can be varied over the full range to be recorded characterized in that the pick-up is connected to an electrical circuit, the output of which is fed to a pair of gas filled discharge tubes with the output of said tubes being fed to the indicator or recorder.

Known indicators or recorders of the kind above referred to fall into two main classes, those in which the pick-up generates an electric current on movement of the disc or diaphragm and those which require to be connected to a circuit having a source of electrical potential which is made use of to provide a signal when the disc or diaphragm moves. Examples of the former pick-ups are the moving coil and moving iron type while examples of the latter are contactor and variable capacitor types.

All the above referred to pick-ups are adaptable, by choosing appropriate circuits, for use with a number of different types of indicators or records the choice of circuit depending principally, firstly on the amplitude of the signal required to operate the device, and secondly as to the character of the operating signal required. In some cases, that is, where the indicator is sensitive, the pick-up can be connected via a suitable input circuit directly to the indicator, while in other cases a substantial signal is required to operate the indicator or recorder; it is with these latter cases that the present invention is particularly concerned.

The output signal of the latter kind can be conveniently provided by a gas filled discharge tube, the use of which effectively avoids the necessity of providing a number of stages of amplification in the associated circuit, but owing to the difficulties above referred to it is proposed to provide two thyratrons having their control grids connected in such a way with respect to the remaining circuitry that the thyratrons are operated sequentially. The input to the thyratrons can be effected in a number of ways, as for example, by means of a center-tap transformer suitably connected in the case where alternate signals are of opposite sign, by means of a phase splitting stage, by means of a phase inverter circuit by which means the signal applied to one grid is the mirror image of that applied to the other, by means of a transitron flip-flop or trigger circuit, or by other means which will be made apparent in the following description.

The accompanying drawings show, by way of example only, embodiments of the invention in which.

In general, the present invention contemplates an arrangement in which a pick-up is connected to a suitable input circuit, the output of which passes to a thyratron circuit by way of a means to feed signals alternately to the thyratrons, the output of the thyratrons being used to operate a recorder, such as a drum recorder. This arrangement is suitable with pick-ups having a signal output of adequate intensity, such as the contactor type, but where a pick-up is used which has a low intensity of output it is desirable to add an amplifier to boost the signal.

If a moving iron or moving coil pick-up is used it can be connected directly to the input of the amplifier thus avoiding the use of the input circuit.

The phase inverter can be a center-tap transformer as above described or alternatively it may be of the kind having a valve in which a load resistor is provided in both the anode and cathode circuits, the output being taken by way of a blocking condenser from the anode and cathode to the grids of the thyratrons, or other suitable phase inverters may be used as desired.

Figure 1:
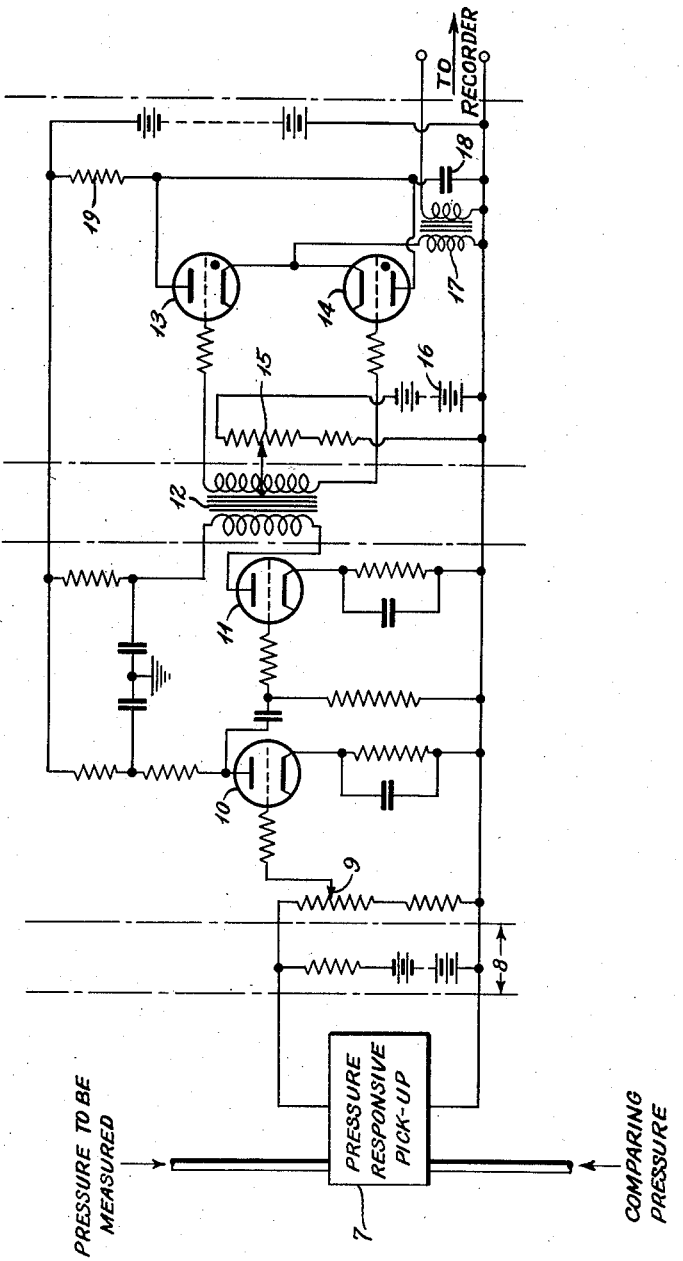
Figure 1 is a schematic circuit diagram showing one form of the invention.

Referring to the drawings, Figure 1 shows a simplified circuit of one embodiment of the invention in which a pick-up 7, which is of the variable capacitor kind and preferably that described and claimed in British Patent Application No. 32053/49, is connected to input circuit 8, the input from which is applied to potentiometer 9 connected in the grid circuit of a first resistance capacity coupled amplying tube 10 which is followed by a further stage of amplification by a tube 11. Phase inversion is provided by means of a center-tap transformer 12 the primarly of which is connected in the anode circuit of the tube 11 while the outer terminals of the secondary winding are connected to the grids of the two output thyratrons 13 and 14. Bias is provided for the thyratrons from potentiometer 15 connected in series with battery 16 by means of the centre tap of the secondary of the transformer 12.

In this embodiment a recorder used is of the type in which a spark is caused to penetrate a specially prepared sheet of paper wrapped around a drum and therefore an output transformer 17 has such characteristics as to provide the required voltage across its secondary terminals to produce such sparks. The primary of this transformer is connected between the cathodes of the thyratrons 13 and 14 and the earth or ground line. The anodes of these thyratrons are connected in parallel whereby they cause the capacitor 18 to become charged by way of the load resistance 19 in the anode circuit so that as soon as one of the thyratrons discharges, the voltage built up in the capacitor 18 is discharged through that thyratron by way of the primary of the transformer 17 to ground thereby inducing a high voltage in the secondary winding thus causing a spark or train of sparks to pass through the paper on the recording drum.

The bias on the grids of the thyratron is so chosen that they remain non-conducting in the absence of a signal, but as soon as a signal arrives one grid runs positive while the other runs negative in relation to the bias with the result that the positive one discharges while the other thyratron remains nonconducting until the following signal is received, which signal will run in the opposite sign from the previous one owing to the movement of the disc or diaphragm in the opposite direction or due to the action of the intermediate circuitry on successive signals.

As the recorder can be synchronized in its movements with the machine being tested by a suitable interconnection of the machine and recorder shafts or otherwise, a series of points can be marked upon the paper corresponding to the pressures at which the disc or diaphragm in the pick-up is caused to move from one position to the other. By changing the standing pressure behind the disc a series of other points are marked upon the paper corresponding to other pressures at which movement of the disc takes place. By progressively changing the standing pressure from one extreme to the other extreme of the range of pressures over which the machine is being tested a complete curve showing the changes in pressure in the machine over a cycle of operation can be drawn. The means for providing the standing pressure can be linked to the machine and a recorder in such a way that this pressure is progressively changed automatically as the recording proceeds.

Furthermore the whole of the apparatus can be arranged to be operated from the main supply together with the bias potential required for controlling the firing of the thyratron valves 13 and 14 of Figure 1, which may be also used as a source of potential in the circuit supplying the impuses corresponding to top dead centre and other details for carrying the invention into effect may be varied without departing from the scope of the invention.

It will be appreciated that further arrangements are compatible with the invention in which the thyratrons are caused to fire sequentially but without the use of a center tap transformer circuit. A proposal is shown in Figure 2 wherein the thyratrons are connected together in a transverter circuit which it is contemplated will be preceeded by one of the circuits shown in Figures 3, 5 and 6.

Figure 2:
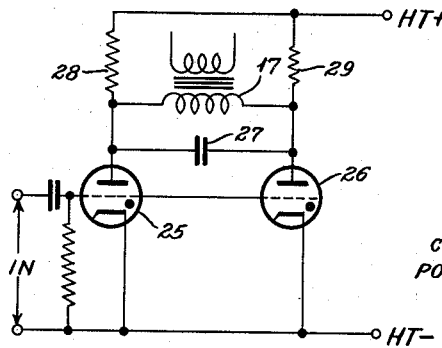
Figure 2 is a schematic circuit diagram of a transverter circuit.

Referring particularly to Figure 2, the grids of the two thyratrons 25 and 26 are strapped together and are fed by a positive pulse from the preceding circuit. The anodes of the thyratrons are connected by a small condenser 27 of about .001 mf. the size depending on the rapidity of operation required, and which feeds a signal from one thyratron to the other which acts to extinguish the one as the other fires and consequently only one will fire at a time. At the commencement of operations it is merely chance which fires first, but as soon as a series of pulses arrives which are distributed at closer intervals than that at which one thyratron will fire repeatedly, the second will fire alternately to the first. The primary of the step-up of the spark producing transformer is connected between the anodes of the thyratrons, while the usual anode loads 28 and 29 are provided as shown. The cathodes are shown connected directly to the earth line, but a bias may be included in each case if desired.

Figure 3:
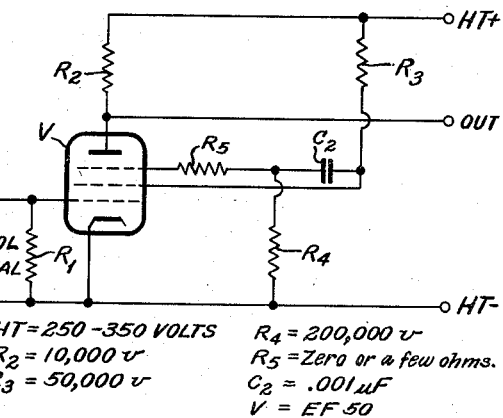
Figure 3 is a schematic circuit diagram of a transitron flip-flop or trigger circuit.
Figure 4:
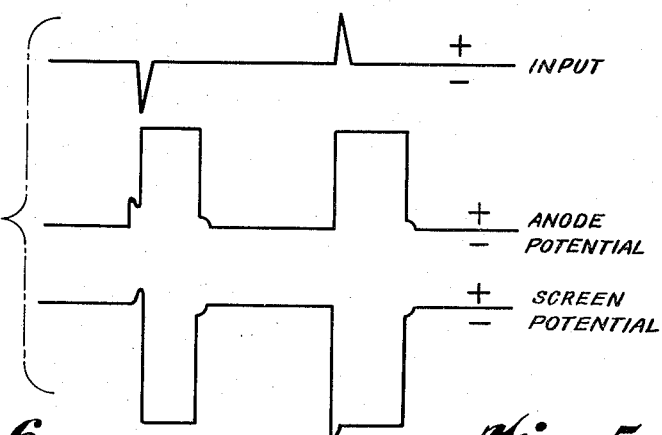
Figure 4 is a time development showing two successive pulses fed to the circuit of Figure 3.

Figure 3 shows a transitron flip-flop or trigger circuit for preceding the circuit of Figure 2 and which gives a positive output pulse for either a negative or positive input pulse, thereby not limiting the circuit to use with pick-ups giving alternative positive and negative pulses. Suitable values for the components are shown in the figure, but it should be clearly understood that these values do to some extent depend on the speed of operations required. The actual input and output wave forms are also shown in Figure 4. If a short duration pulse is required instead of the square pulse, the latter may be differentiated by the usual condenser resistor arrangement.

Figure 5:
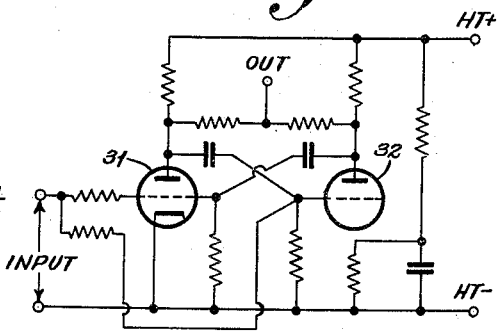
Figure 5 is a schematic circuit diagram of a two-valve flip-flop circuit.

Another circuit that can be made to operate on both positive and negative input pulses is the two-valve flip-flop circuit modified as shown in Figure 5. The negative pulse operates tube 31 and the positive pulse tube 32, while the output pulses at the anodes are both positive.

Figure 6:
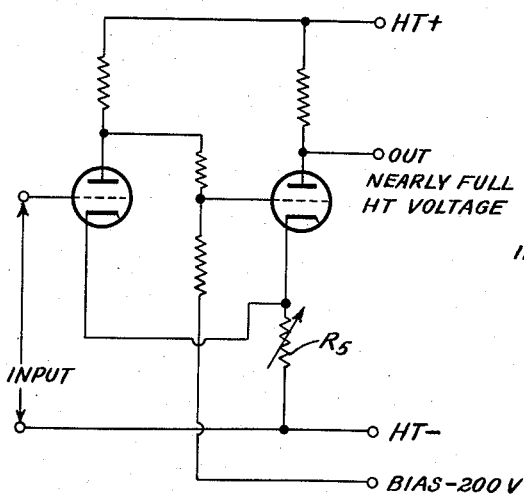
Figure 6 is a schematic circuit diagram of a Schmitt trigger circuit.

A circuit which gives a very large output is the Schmitt trigger circuit of Figure 6. This circuit triggers in one direction when the input potential is raised to a critical value and triggers in the other direction when the potential is reduced to another level. The two potentials may be made further apart by increasing the value of $R^5$ to such a point that it responds to extreme positive and negative pulses.

In a further alternative arrangement not illustrated the thyratrons may be each fed separately by way of a condenser from the anodes of the transverter circuit using cold cathode discharge tubes arranged similarly to the circuit of Figure 2 but without the transformer, in which the alternation of the discharge is provided by the discharge tube instead of the thyratrons themselves as was the case in Figure 1. Positive pulses must of course be applied to the grids of the cold cathode discharge tubes by a circuit such as any one of those shown in Figures 3, 5 and 6.

Although the present invention has been described with reference to specific embodiments, nevertheless, various changes and modifications obvious to one skilled in the art are within the spirit, scope and contemplation of the invention.

What is claimed is:

1. In a pressure recorder, the combination comprising a pick-up device adapted to initiate a series of signals, means to present the fluid pressure to be recorded and a known variable pressure to said pick-up device, output means connected with said pick-up device to provide output signals, a pair of gas-filled discharge tubes each connected to actuate the recording means in the same manner when discharging, a circuit connecting the discharge tubes and the output means to simultaneously feed the signals to both tubes and including control means to cause successive alternate signals beginning with the first of said signals to discharge one tube and to cause successive alternate signals beginning with the second of said signals to discharge the other tube, and recording means operative in response to the discharge of the tubes.

2. In a pressure measuring instrument as defined in claim 1 the further improvement of a condenser connected in circuit with the plates of said gas filled tubes and a transformer the primary of which is connected between the plates of the gas-filled tubes and receives energy upon the discharge of said gas filled tubes and the secondary of which supplies the energy to said means to record.

3. In a pressure measuring instrument as defined in claim 1 in which the output means provides successive signals of like phase, said control means including a transverter circuit in which said gas filled tubes are arranged, said transverter circuit characterized by a condenser connected across the plates of said gas filled tubes.

4. In a pressure measuring instrument as defined in claim 1 the further improvement of said output means including a two-tube flip-flop circuit such that signals of one sign operate one of said tubes and signals of opposite sign operate the other of said tubes, the output signals of said tubes being of one sign.

5. Electronic relay comprising a pair of thyratrons, an input circuit comprising a condenser one end of which is connected to the control grids of both thyratrons for feeding signals to the grids of both thyratrons simultaneously in the same phase, and an output circuit into which both tubes discharge comprising a transformer each end of the primary of which is connected to the plate of one of the thyratrons, and a condenser connected between said plates.

6. Electronic relay comprising a pair of thyratrons, an input circuit including a transitron trigger circuit characterised by a pentode tube having a control grid, a pair of resistors connected in series between a second grid and cathode, a condenser connected between the junction of the resistors and a third grid to produce output signals of one sign regardless of the sign of the input signals to the control grid, connected by a condenser to the control grids of both thyratrons for feeding signals to the grids of both thyratrons simultaneously of the same sign and an output circuit into which both thyratrons discharge comprising a transformer each end of the primary of which is connected to the plate of one of the thyratrons, and a condenser connected between said plates.

7. Electronic relay comprising a pair of thyratrons, an input circuit including a two-tube flip-flop circuit so arranged that signals of one sign operate one of said tubes and signals of opposite sign operate the other of said tubes, the output signals of said tubes being of one sign, and connected to the control grids of both thyratrons by way of a condenser for feeding signals to the grids of both thyratrons simultaneously of the same sign, and an output circuit into which both thyratrons discharge comprising a transformer each end of the primary of which is connected to the plate of one of the thyratrons and a condenser connected between said plates.

8. In a pressure recorder the combination comprising a pick-up device adapted to initiate a series of signals, means to present the fluid pressure to be recorded and a known variable pressure to said pick-up device, output means connected with said pick-up device to provide signals in push-pull, a pair of grid controlled gas filled discharge tubes connected to said output means with their grids in push-pull and their plates together such as to produce voltages of the same polarity and substantially the same amplitude in a common cathode output circuit, with the application of said signals of alternate opposite sign to said grids and a recorder in the output circuit.

9. In a pressure measuring instrument as defined in claim 8 the further improvement of said output means being a transformer and the grids being connected thereto in push-pull, the transformer having a centre tapped secondary and a source of bias voltage connected to said tap.

10. In a pressure recorder, the combination comprising a pick-up device adapted to initiate a series of signals, means to present the fluid pressure to be recorded and a known variable pressure to said pick-up device, output means connected with said pick-up device to provide output signals, a pair of grid-controlled gas-filled discharge tubes each connected to actuate the recording means in the same manner when discharging, a circuit connecting the discharge tubes and the output means to simultaneously feed the signals to the grids of both tubes and including control means to cause successive alternate signals beginning with the first of said signals to discharge one tube and to cause successive alternate signals beginning with the second of said signals to discharge the other tube, the plates of the tubes being connected together and to a source of voltage and recording means operative in response to the discharge of the tubes.

11. In a pressure measuring instrument as in claim 10, in which the control means includes a condenser connected to the plates of the tubes to limit the duration of discharge so as to produce a recorded signal of pulse like form of short duration.

References Cited in the file of this patent

UNITED STATES PATENTS

| | | |
|---|---|---|
| 2,234,978 | Overbeck | March 18, 1941 |
| 2,503,091 | Brooke et al. | April 4, 1950 |
| 2,688,248 | Hart et al. | Sept. 7, 1954 |

OTHER REFERENCES

Article: "A New High Speed Engine Indicator" by Taylor & Draper, published in Mechanical Engineering, vol. 55, 1933, pp. 169–171.

Text: Electron Tube Circuits—Seely, McGraw Hill, N. Y., 1950, pp. 418–419.